(12) United States Patent
Watanabe

(10) Patent No.: US 8,225,412 B2
(45) Date of Patent: Jul. 17, 2012

(54) DOCUMENT VERIFICATION METHOD, DOCUMENT VERIFICATION APPARATUS AND STORAGE MEDIUM

(75) Inventor: Ryutaro Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 854 days.

(21) Appl. No.: 12/127,320

(22) Filed: May 27, 2008

(65) Prior Publication Data

US 2008/0313740 A1 Dec. 18, 2008

(30) Foreign Application Priority Data

Jun. 15, 2007 (JP) ................................ 2007-159295

(51) Int. Cl.
*G06F 17/30* (2006.01)

(52) U.S. Cl. ................ 726/26; 726/27; 726/28; 726/29; 726/30; 726/31; 726/32; 380/44; 713/176; 713/177; 713/181

(58) Field of Classification Search ............. 726/26–33; 713/176, 177, 181; 382/310; 358/1.15; 380/44
See application file for complete search history.

(56) References Cited

U.S. PATENT DOCUMENTS

| | | | | |
|---|---|---|---|---|
| 5,915,024 A * | 6/1999 | Kitaori et al. | ................. | 713/176 |
| 7,360,247 B2 | 4/2008 | Girard et al. | | |
| 2003/0012374 A1 * | 1/2003 | Wu et al. | ......................... | 380/44 |
| 2004/0088555 A1 | 5/2004 | Girard et al. | | |
| 2005/0091338 A1 * | 4/2005 | de la Huerga | ................. | 709/217 |
| 2005/0262371 A1 | 11/2005 | Luke et al. | | |

FOREIGN PATENT DOCUMENTS

| | | |
|---|---|---|
| CN | 1432148 | 7/2003 |
| CN | 1722731 | 1/2006 |
| JP | 2005-159492 | 6/2005 |
| JP | 2006-217489 A | 8/2006 |
| JP | 2006-235930 A | 9/2006 |
| JP | 2007-081784 A | 3/2007 |
| WO | 01/82267 A | 11/2001 |

OTHER PUBLICATIONS

Notification of First Office Action, dated Jun. 17, 2010, issued in counterpart Chinese Application No. 200810100464.4.
Japanese Office Action dated Marc 23, 2012, issued by the Japanese Patent Office, in Japanese Patent Application No. 2007-159295.

* cited by examiner

*Primary Examiner* — Thanhnga B Truong
(74) *Attorney, Agent, or Firm* — Fitzpatrick, Cella, Harper & Scinto

(57) ABSTRACT

If the signatures of all documents in a binder document are verified when the binder document is verified, some types of documents stored in the binder document may affect the result of the verification of the binder document. When verification of a binder is performed, it is determined, for each document in the binder document, whether the document is a verification target document or not. On the basis of the result of verification of a document determined as a verification target, the result of verification of the binder document is outputted.

6 Claims, 18 Drawing Sheets

SIGNATURE REGISTRATION PROCESSING

CERTIFICATE CONFIRMATION PROCESSING

DOCUMENT VERIFICATION PROCESSING

SIGNATURE VERIFICATION PROCESSING

DOCUMENT VERIFICATION METHOD, DOCUMENT VERIFICATION APPARATUS AND STORAGE MEDIUM

BACKGROUND OF THE INVENTION

1. Field of the Invention

The present invention relates to a document verification method, a document verification apparatus, and a storage medium in which a document verification program is stored.

2. Description of the Related Art

With the development of the information society, it has been common to store electronic data created by a word processor and the like or electronic data obtained by scanning a paper document with a copying machine and digitizing the data into a document management system and the like.

Recently, with the rise of consciousness of security, it has become increasingly common to give an electronic signature to such an electronic document to show the identity of a person who gives the signature or confirm that the electronic document has not been falsified or to give a timestamp to certify the existence of the electronic document. In Japanese Patent Laid-Open No. 2005-159492, it is described to visualize time information included in an electronic signature so that the time when the electronic signature is given can be easily confirmed.

In such a situation, a technique for collectively verifying signatures in a document to which multiple signatures and timestamps are given is gradually utilized. Furthermore, with the increase in the number of documents to which signatures and timestamps are given, a technique for collectively verifying a lot of such documents by a document management system is also gradually utilized.

Since, in such a system, the number of signature verification results is very large, the verification results are collectively notified to a user.

SUMMARY OF THE INVENTION

The present invention relates to verification of a binder (binder document) in which multiple documents are collected as one document.

When a binder is targeted by verification, it is conceivable to collect the results of verifications of documents included in the binder and notify them as the result of verification of the binder. In such a case, since all the documents including signatures are targeted by verification, the result of verification of the binder document becomes "invalid" if there is a problem in the result of verification of only one document among the documents included in the binder.

However, there is a possibility that important documents which require the result of electronic signature verification to be "valid", from the legal point of view, and documents for which it does not matter whether the result of electronic signature verification is "valid" or "invalid" (for example, a reference document which does not have to be verified) exist. However, there is a problem that, when those documents are mixed in a binder and they are collectively verified without distinction, the result of electronic signature verification of the binder may be determined as "invalid" although the important documents are legally valid.

In order to solve the above problem, the document verification method of the present invention is a document verification method for an apparatus for verifying a binder document which includes multiple documents, the method including: a determination step of determining, for each document included in the binder document, whether the document is a verification target document or not; a verification step of verifying a document which has been determined as the verification target document in the determination step; and an output step of outputting the result of verification of the binder document, on the basis of the result of the verification of the verification target document.

In the present invention, when a binder document is verified, the result of the verification of the binder is outputted on the basis of the result of verification of a verification target document included in the binder document. Therefore, even if a document which is not related to the validity of the binder document is bound, it does not affect the verification of the binder. That is, it is possible to output the result of verification of a binder document on the basis of a document which is important to the validity of the binder document.

Further features and the aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DESCRIPTION OF THE EMBODIMENTS

The outline of an embodiment according to the present invention will be described with the use of FIG. 1.

A document management server 1003 stores various document files. This document management server 1003 is capable of retrieving a desired document file from among the stored document files as appropriate.

A document registration apparatus 1001 gives a signature to a document file and then creates a new document file. Then, it sends the new document file to the document management server 1003 to cause the document management server 1003 to store the document file. That "the document registration apparatus 1001 causes the document management server 1003 to store a document file" in this way will be hereinafter described as "the document registration apparatus 1001 registers a document file with the document management server 1003".

A document verification apparatus 1002 acquires a document file stored in the document management server 1003 and verifies a signature existing in the acquired document file.

Each of the document management server 1003, the document registration apparatus 1001 and the document verification apparatus 1002 is totally controlled by a CPU (not shown) provided for each of the apparatuses.

In this specification, both of an "electronic signature" and a "timestamp signature" are assumed to be a kind of "signature". Therefore, the expression of "giving a signature" in this specification means any of "giving an electronic signature", "giving a timestamp signature", and "giving both of an electronic signature and a timestamp signature".

The document registration apparatus 1001 is connected to a scanner 1004 and has a function of acquiring a JPEG-format document file via TWAIN. Furthermore, the document registration apparatus 1001 can also acquire a document file in a shared storage device 1006. Furthermore, the document registration apparatus 1001 is assumed to be able to generate a binder document by specifying multiple documents to collect them as a binder document.

The shared storage device 1006 stores, for example, document files sent being attached to e-mails via the Internet 1007 and document files sent by an SMB or FTP sending function from multi-function machines 1005 (hereinafter referred to as an MFP 1005). Among the document files stored in the shared storage device 1006, there exist document files to which a signature is not given yet and document files to which a signature is given by a different apparatus in advance. Furthermore, there may be a case where a binder document sent via the Internet is stored in the shared storage device 1006.

Figure 1:
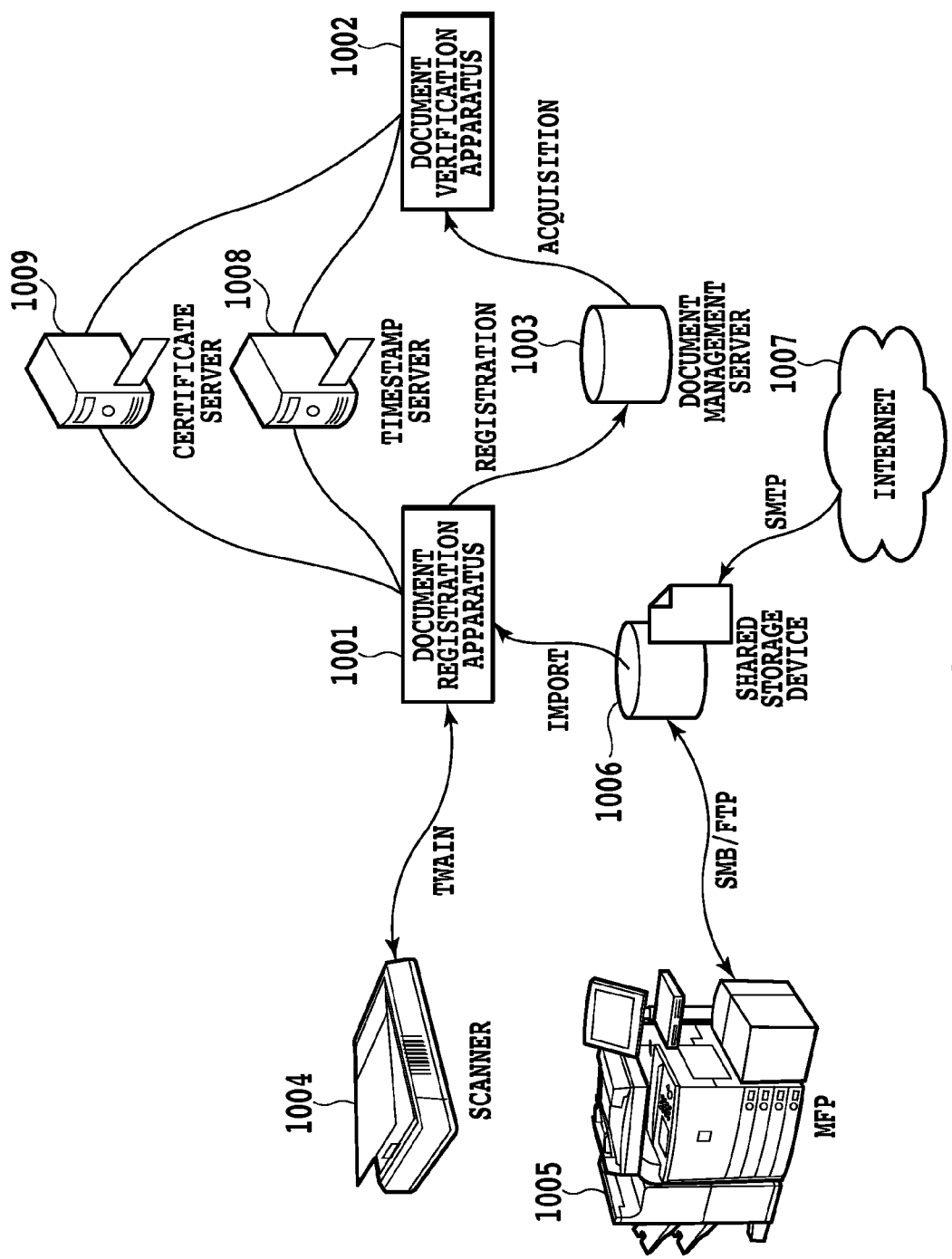
FIG. 1 is a diagram showing the outline of an embodiment according to the present invention.

Description has been made on the assumption that the document registration apparatus 1001 and the document verification apparatus 1002 are different apparatuses, with reference to FIG. 1. However, the functions of both apparatuses may be executed by one apparatus.

Figure 3:
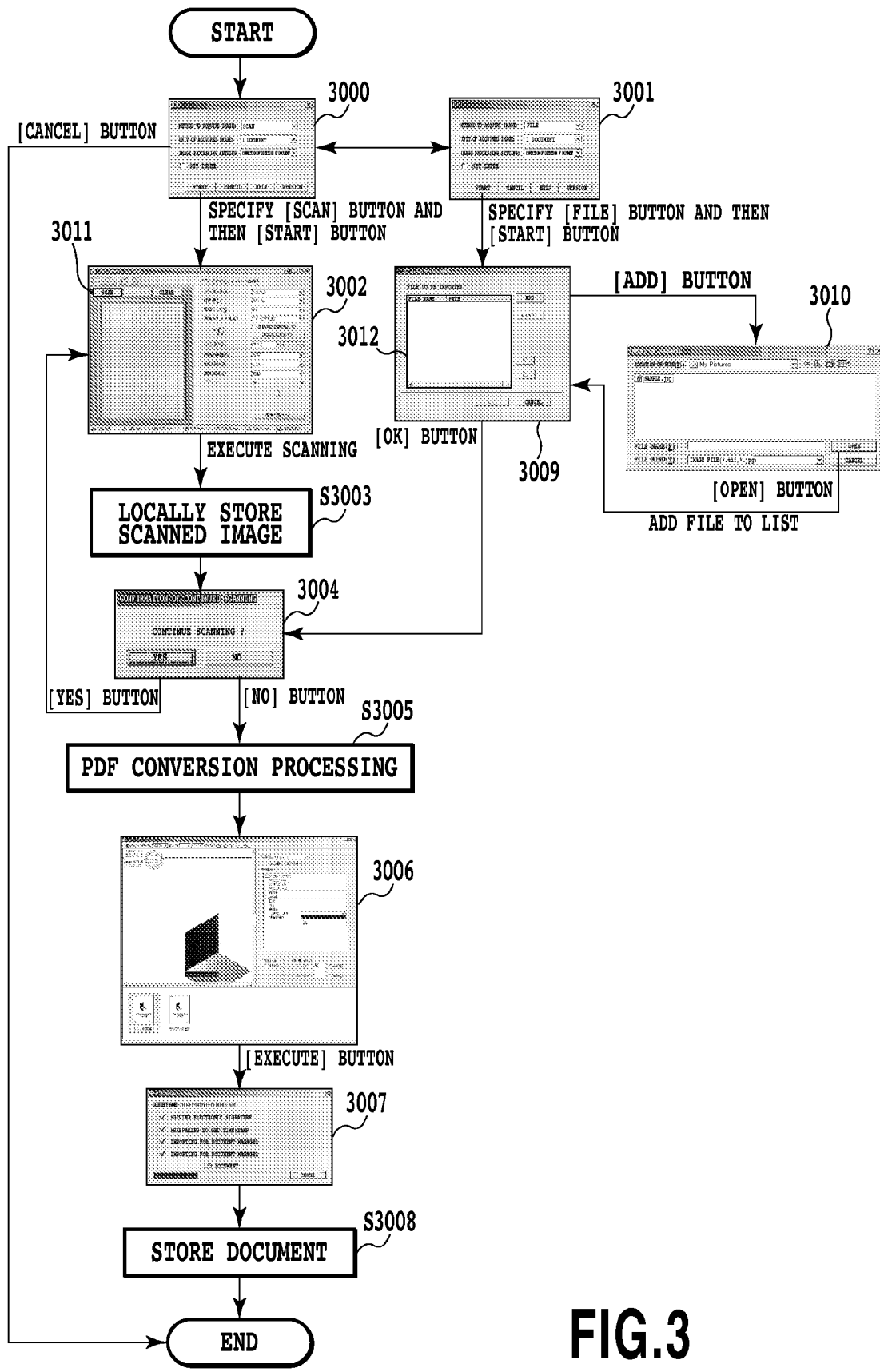
FIG. 3 is a diagram showing the transition of dialogs displayed when a document registration apparatus 1001 executes processing for acquiring a document file, giving a signature, and registering the document file with a document management server 1003, according to the present invention.

FIG. 3 shows the transition of dialogs which are displayed on a display section (not shown) of the document registration apparatus 1001 when the document registration apparatus 1001 executes processing for acquiring a document file, giving a signature, and registering the document file with a document management server 1003.

A dialog 3000 is an initial dialog displayed on the display section connected to the document registration apparatus 1001. A user can select any one of "SCAN" and "FILE" on the dialog 3000 with the use of a keyboard and a mouse connected to the document registration apparatus 1001. If the user selects "SCAN", it means that the user selects to acquire a document file into the document registration apparatus 1001 by scanning. If the user selects "FILE", it means that the user selects to acquire a document file stored in the shared storage device 1006 into the document registration apparatus 1001. A dialog 3001 is a dialog to be displayed on the display section when the user selects "FILE" on the dialog 3000.

Here, it is assumed that the user selects "SCAN" and then selects "START" on the dialog 3000. Then, a scanning dialog 3002 for causing the user to select various settings for scanning is displayed on the display section.

When the user selects a scan button 3011 in the scanning dialog 3002 after selecting a color mode, resolution and the like on the scanning dialog 3002, the scanner 1004 starts scanning. Furthermore, the scanner 1004 once stores a scanned image into predetermined local storage unit within the document registration apparatus 1001 at step S3003. After that, the document registration apparatus 1001 displays a continued scanning dialog 3004 for causing the user to select whether or not to continue scanning, on the display section.

When the user selects "YES" on the continued scanning dialog 3004, the document registration apparatus 1001 displays the scanning dialog 3002 on the display section and continues the processing on the basis of the scanning dialog 3002. When the user selects "NO" on the continued scanning dialog 3004, the document registration apparatus 1001 converts the scanned image stored in the predetermined storage unit into PDF to generate a PDF-format document file at step 3005. When the generation ends, the document registration apparatus 1001 displays a preview dialog 3006 on the display section.

The preview dialog 3006 is a dialog for preview-displaying the PDF-format document file on the display section. The user performs input of index information to be given to the PDF-format document file and the like on this preview dialog 3006. When the input of the index information and the like end, and the user selects "EXECUTE" on the preview dialog 3006, the document registration apparatus 1001 gives a signature to the PDF-format document file and generates a new document file. Then, the document registration apparatus 1001 registers this newly generated document file with the document management server 1003. Until all document files are registered with the document management server 1003, the document registration apparatus 1001 displays a processing state display dialog 3007 showing the current processing state on the display section. At step 3008, all the document files are registered with and stored in the document management server 1003. After that, the document registration apparatus 1001 deletes the processing state display dialog 3007 from the display section.

On the other hand, when the user selects "FILE" and then selects "START" on the dialog 3000, a dialog 3009 for selecting a file which the user wants to acquire is displayed.

When the user selects "ADD" on this dialog 3009, the document registration apparatus 1001 displays a dialog 3010 for causing the user to specify an image file on the display section. When the user specifies any file in this state, the document registration apparatus 1001 displays the dialog 3009 on the display section again. In an area 3012 in the dialog 3009, names of documents specified by the user are enumerated.

When the user selects "OK" on the dialog 3009, the document registration apparatus 1001 converts each of the document files enumerated on the area 3012 in the dialog 3009, to a PDF-format document file.

Figure 6:
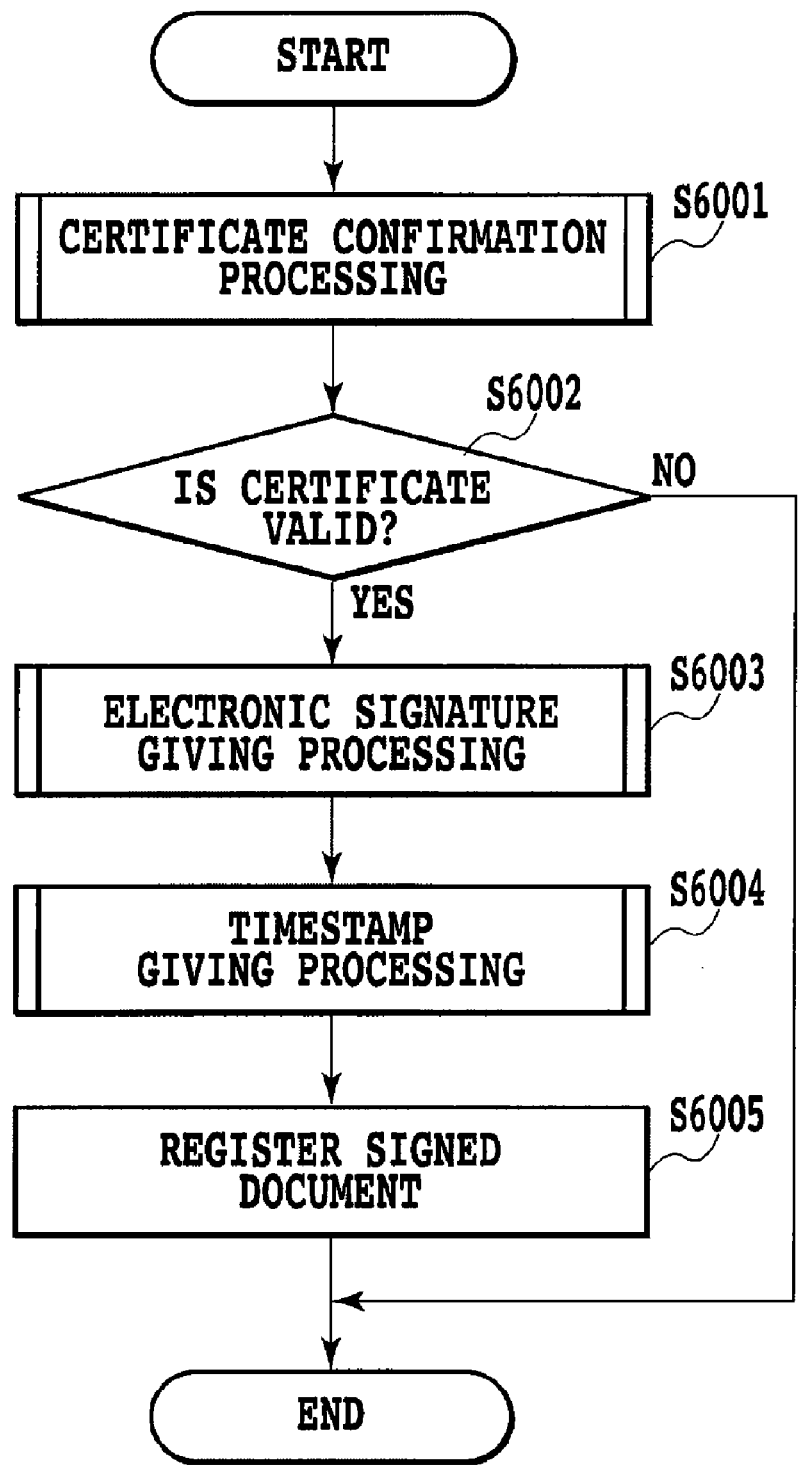
FIG. 6 is a diagram showing the flow of processing by the document registration apparatus 1001 for giving a signature to a document file and registering the document file with the document management server 1003, according to the present invention.

FIG. 6 shows the flow of processing executed when the document registration apparatus 1001 gives a signature to a document file and registers the document file with the document management server 1003. The document registration apparatus 1001 which executes each processing in this processing flow is totally controlled by a CPU (not shown) which the document registration apparatus 1001 has.

It is assumed that a hash function, a secret key, and a certificate corresponding to the secret key are stored in the storage unit in the document registration apparatus 1001 in advance before each processing in this flowchart is executed. The certificate includes a public key. Furthermore, it is assumed that, on the certificate, there are described the serial number of the certificate, information indicating which server has issued the certificate, information about a secret key holder (such as the name of the secret key holder), and information such as the period of validity of the certificate.

At step 6001, the document registration apparatus 1001 checks the validity of the certificate to be used for an electronic signature (this certificate to be used for an electronic signature will be hereinafter referred to as a target certificate). The details of the processing for checking the validity of the target certificate will be described later with the use of FIG. 7.

At step 6002, if it is confirmed by step 6001 that the target certificate is valid, the flow proceeds to step 6003. If it is confirmed that the target certificate is invalid, the processing of this flowchart ends.

At step 6003, by giving an electronic signature to the document file with the use of the target certificate which has been confirmed to be valid, the document registration apparatus 1001 creates a new document file attached with the electronic signature. The details of the processing for giving an electronic signature will be described later with the use of FIG. 8.

Figure 9:
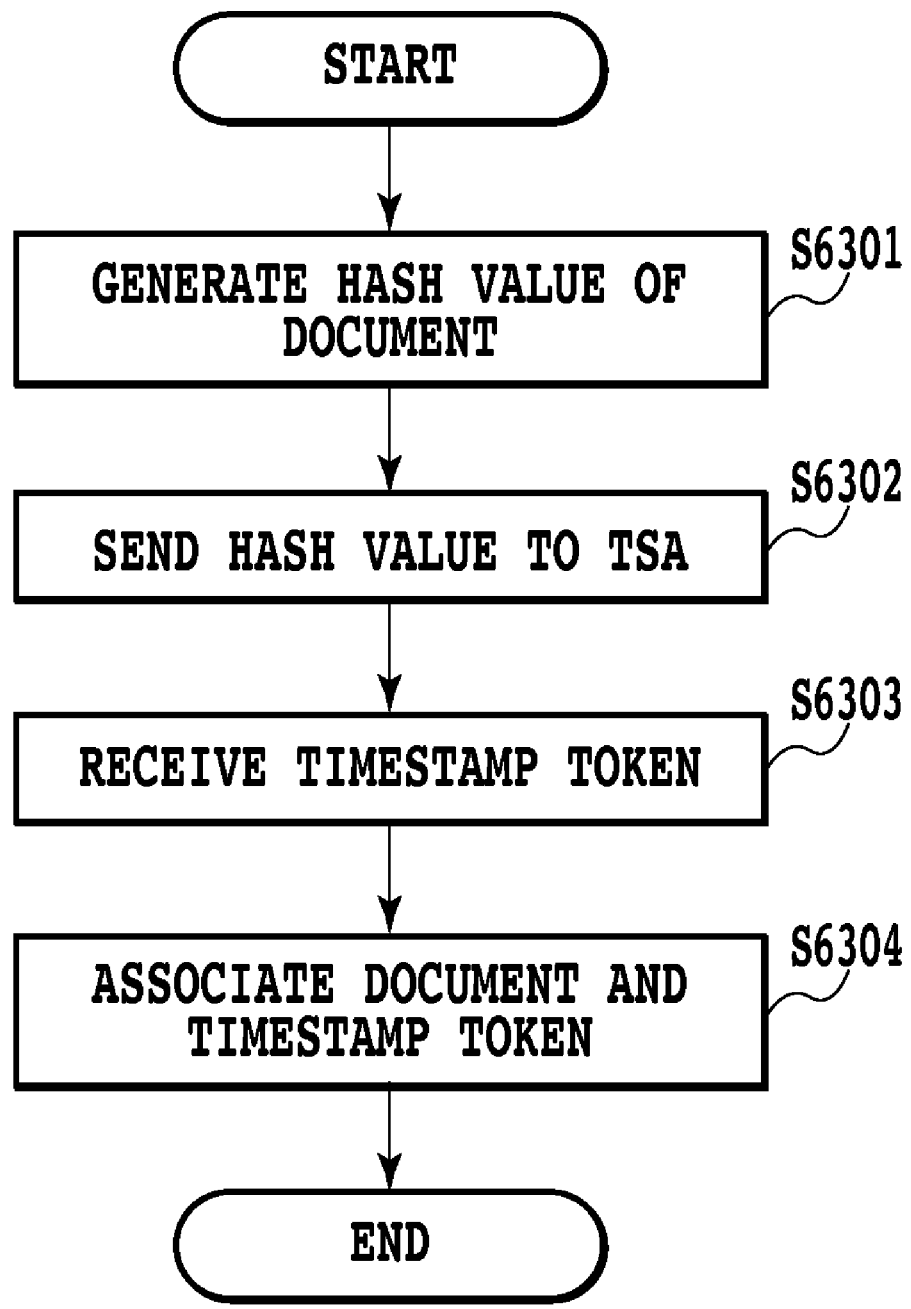
FIG. 9 is a diagram showing the flow of timestamp signature giving processing according to the present invention.

At step 6004, by giving a timestamp signature to the document file generated at step 6003, the document registration apparatus 1001 further creates a new document file attached with the timestamp. The details of the processing for giving a timestamp signature will be described later with the use of FIG. 9.

At step 6005, the document registration apparatus 1001 registers the document file generated at step 6004 with the document management server 1003. In this embodiment, description has been made on the assumption that an electronic signature and a timestamp signature are given to a document file and a new document file is generated. However, it is not necessarily required to generate a new document file. For example, the document file before being given signatures, the electronic signature and the timestamp signature may be registered as different files in association with one another.

Of course, it is assumed that, in the case where a failure occurs during the processing at step 6003 (the electronic signature giving processing), the processing at step 6004 (the timestamp signature giving processing) or the processing at step 6005 (the processing for registering a document file and the like), appropriate error processing is performed.

The processing at step 6001 (the processing for checking the validity of a certificate to be used for an electronic signature) will be described in detail with the use of FIG. 7.

At step 6101, the document registration apparatus 1001 determines the source which has issued the target certificate. Furthermore, the document registration apparatus 1001 confirms whether the issue source is a reliable certificate server (certification authority) or not. It is assumed that information about which server is reliable is registered with the operating system in the document management server 1003 in advance, and that the document registration apparatus 1001 can acquire this information. If it is confirmed that the issue source is reliable, the flow proceeds to step 6102. If it is confirmed that the issue source is not reliable, the flow proceeds to step 6106, and sets the state of the target certificate as invalid. In this specification, description will be made on the assumption that a certificate server 1009 is a reliable certificate server unless otherwise specified. Similarly, description will be made on the assumption that the issue source which issues each certificate is this certificate server 1009 unless otherwise specified.

At step 6102, the document registration apparatus 1001 confirms whether the period of validity described on the target certificate has expired or not. If the period of validity has expired, the flow proceeds to step 6106 and sets the state of the target certificate as invalid. If the period of validity has not expired, the flow proceeds to step 6103.

At step 6103, the document registration apparatus 1001 acquires a CRL (Certificate Revocation List) which is a list of expired certificates from the certificate server 1009 which is the issue source of the target certificate.

At step 6104, the document registration apparatus 1001 confirms whether the target certificate is included in the CRL. If the target certificate is included, it means that the target certificate is already expired, and therefore, the flow proceeds to step 6106 and sets the state of the target certificate as invalid. If it is not included, the flow proceeds to step 6105 to set the state of the target certificate as valid.

Figure 8:
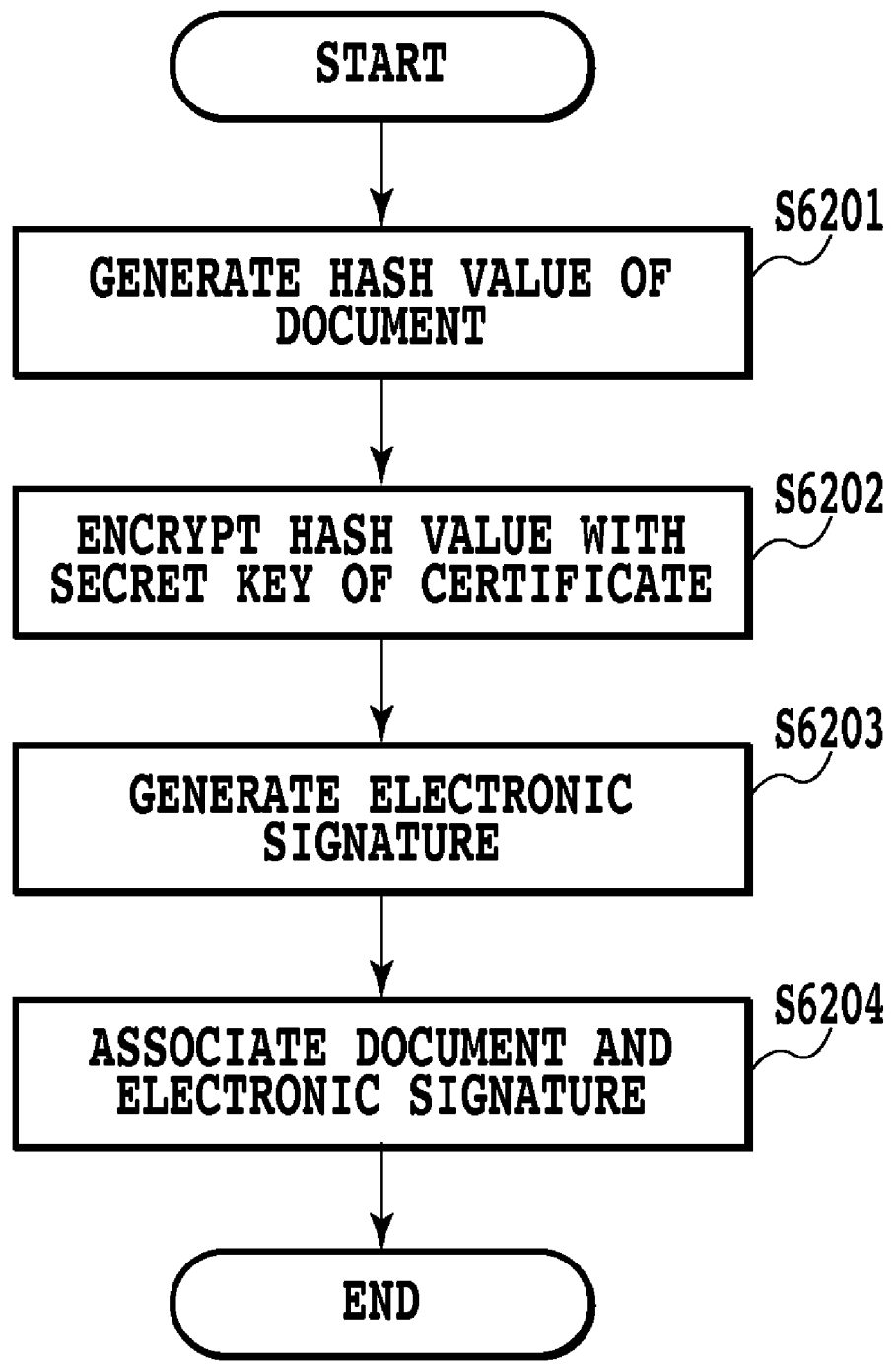
FIG. 8 is a diagram showing the flow of electronic signature giving processing according to the present invention.

Next, the processing at step 6003 (the electronic signature giving processing) will be described in detail with the use of FIG. 8.

At step 6201, the document registration apparatus 1001 calculates a hash value of the document file. As for a hash function to be used for calculating the hash value, a well-known technique, for example, MD5 or SHA-1 can be used.

If, at step 6201, a signature (a timestamp signature or an electronic signature) is already included in the document file, the hash value is determined with the signature included. This will be described with the use of FIGS. 13 to 17.

Figure 13:
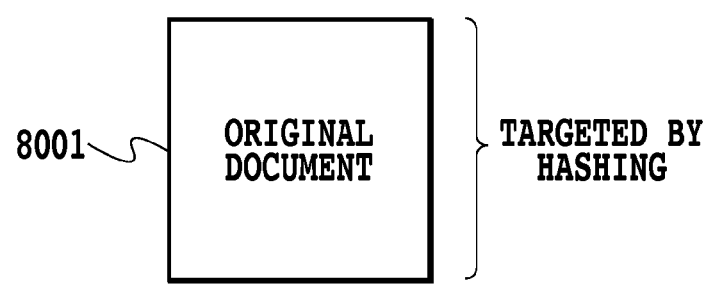
FIG. 13 is a diagram showing a document file having only an original document according to the present invention.

The document file shown in FIG. 13 includes only an original document 8001 (without a signature). When an electronic signature is given to this document file, only the original document 8001 is targeted by calculation of the hash value. When the document registration apparatus 1001 performs each processing shown in FIG. 6 for the document file shown in FIG. 13 to give an electronic signature (a signature 1), the document file shown in FIG. 14 is generated as a result.

Figure 14:
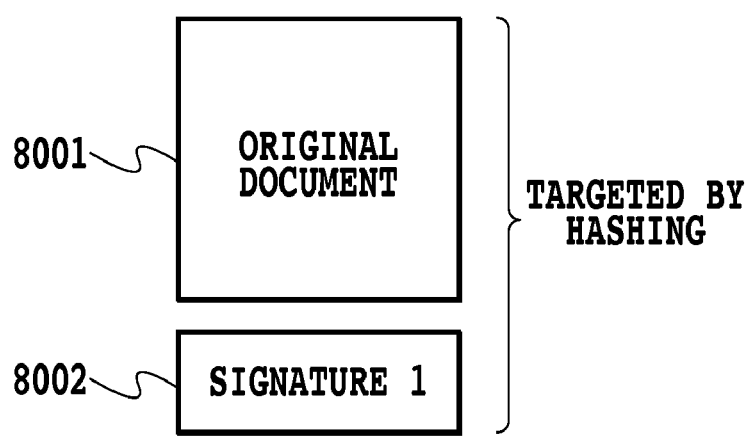
FIG. 14 is a diagram showing a document file having the original document and a signature 1 according to the present invention.

The document file shown in FIG. 14 includes the original document 8001 and the electronic signature 1. When an electronic signature is further given to this document file, both of the original document 8001 and the signature 1 are targeted by the calculation of the hash value. When the document registration apparatus 1001 performs each processing shown in FIG. 6 for the document file shown in FIG. 14 to give an electronic signature (a signature 2), the document file shown in FIG. 15 is generated as a result.

Figure 15:
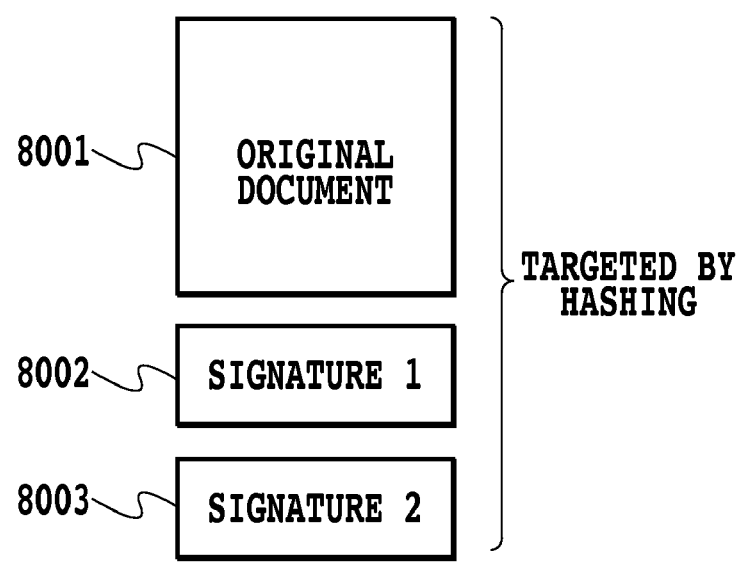
FIG. 15 is a diagram showing a document file having the original document, the signature 1 and a signature 2 according to the present invention.

The document file shown in FIG. 15 includes the original document 8001, the signature 1 (8002) and the signature 2 (8003).

At step 6202, the document registration apparatus 1001 encrypts the hash value calculated at step 6201 with a secret key included in the target certificate.

At step 6203, the document registration apparatus 1001 generates an electronic signature which includes the encrypted hash value and the target certificate. As the format of the electronic signature here, for example, PKCS#7, PDF Signature by Adobe Systems Incorporated and the like can be used. The document registration apparatus 1001 may generate the electronic signature so that information indicating that the document file is to be registered with the document management server 1003 and the time of generation of the electronic signature are further included.

At step 6204, the document registration apparatus 1001 associates the document file and the electronic signature.

Next, the processing at step 6004 (the timestamp signature giving processing) will be described in detail.

At step 6301, the document registration apparatus 1001 calculates a hash value of the document file (which has been generated, with an electronic signature attached, at step 6003).

It is assumed that the document file before being attached with an electronic signature at step 6003 (the electronic signature giving step) is a document file including only the original document 8001 as shown in FIG. 13. In such a case, a document including the original document 8001 and the signature 1 (8002) as shown in FIG. 14 is generated at step 6003. Then, at this step 6301, a hash value is calculated with both of the original document 8001 and the signature 1 (8002) targeted.

At step 6302, the hash value calculated at step 6301 is sent to a TSA 1008 (Time-Stamping Authority).

When receiving the hash value, the TSA 1008 encrypts the received hash value with a secret key specific to the TSA 1008. Then, the encrypted hash value and the current time are integrated to generate integrated information. Then, a timestamp token is generated in a manner that this integrated information and a certificate having a public key corresponding to the secret key are included. When the generation of the timestamp token ends, the TSA 1008 sends the timestamp token to the document registration apparatus 1001.

At step 6303, the document registration apparatus 1001 receives the returned timestamp token.

At step 6304, a timestamp signature is generated in a manner that the received timestamp token and other necessary information are included. Then, the generated timestamp signature is given to the document file (which has been generated with an electronic signature attached, at step 6003) and generate a new document file.

Figure 18:
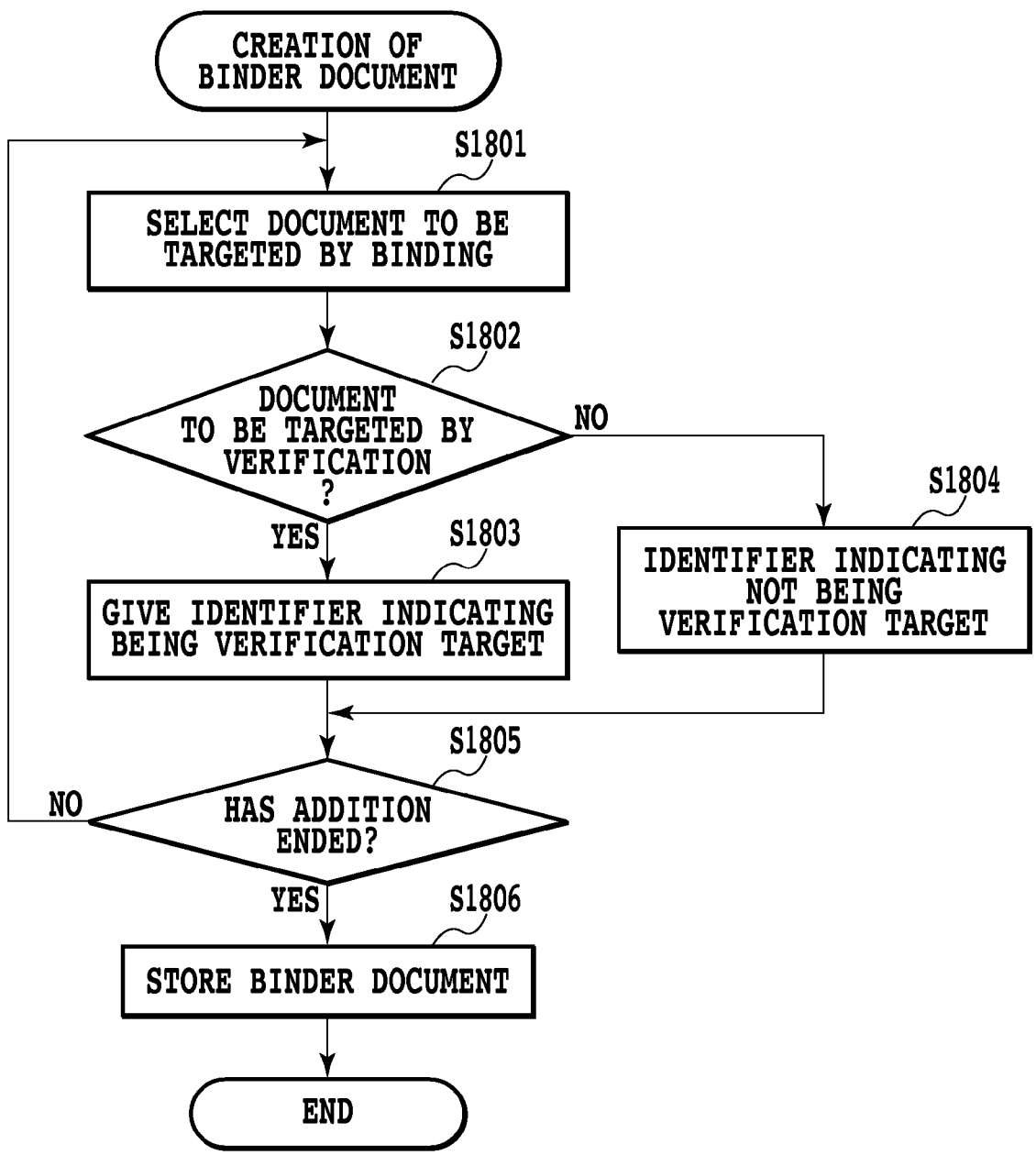
FIG. 18 is a flowchart showing binder document creation processing.

Processing for creating a binder document will be described with the use of FIG. 18. In this embodiment, it is possible to specify, for each document to be bound (each document to be stored in a binder document), whether or not the document is to be targeted by verification when the document is verified.

In this embodiment, it is assumed that the document registration apparatus 1001 performs the processing for creating a binder document and registers the binder document with the document management server 1003, but it is not limiting. For example, the document management server 1003 may bind documents managed by the document management server and create a binder document, on the basis of a user instruction.

At step 1801, the document registration apparatus 1001 selects binding target documents which are to be stored in a binder document, on the basis of a user instruction. Here, the selected documents may be documents already managed by the document management server 1003 or may be documents stored in the shared storage device.

At step 1802, it is determined whether or not the selected documents are to be targeted by verification, on the basis of a user instruction. Here, if it is determined that the document is specified by the user as a document to be targeted by verification, the flow proceeds to step 1803. If it is determined that the document is specified by the user as a document not to be targeted by verification, the flow proceeds to step 1804. Though it is determined on the basis of a user instruction whether or not the document is to be targeted by verification, it is not limiting. For example, by storing the types of documents to be targeted by verification (for example, a legally important document) in a table or the like, it may be automatically determined, by determining the type of a binding target document, whether or not the document is to be targeted by verification. The type of document may be determined on the basis of a document identifier or character code added to an electronic document, a character recognition result obtained by OCR (Optical Character Recognition) processing of a scanned document, or the like. The type of document may be identified on the basis of the format of an electronic signature already added to the binding target document.

At step 1803, an identifier indicating that the binder document is a verification target document is stored. This identifier is stored, for example, in the binder document, but it is not limiting. It may be stored as a file associated with the binder document.

At step 1804, an identifier indicating that the binder document is not a verification target document is stored.

At step 1805, it is determined whether or not there is any other document to be bound. If it is determined that there is any other binding target document, the flow returns to step 1801 and selects the next binding target document. On the other hand, if it is determined that there is not any other document to be added, the flow proceeds to step 1806 and registers and stores the created binder document into the document management server 1003.

Figure 4:
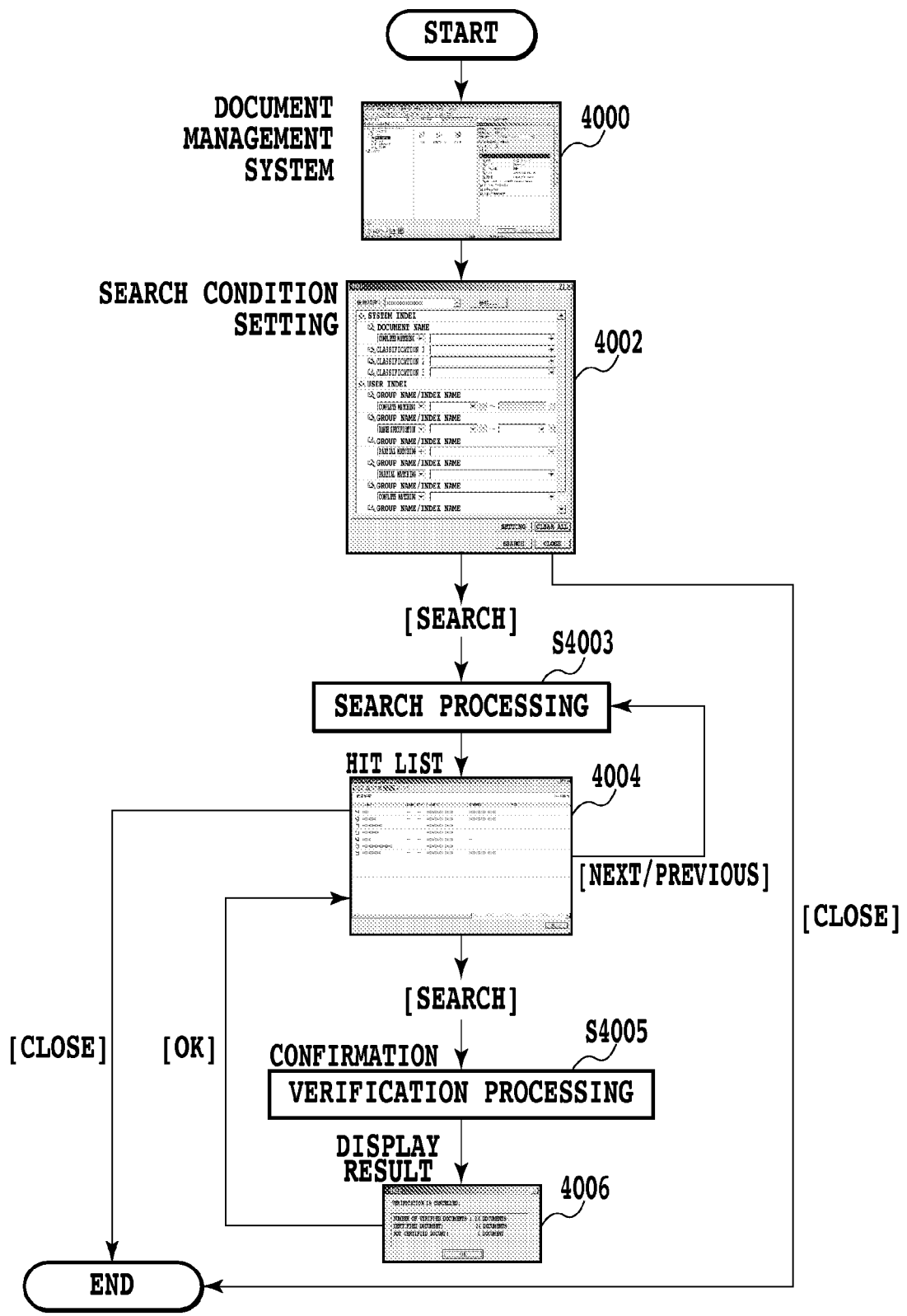
FIG. 4 is a diagram showing the transition of dialogs which are displayed on a display section of a document verification apparatus 1002 when the document verification apparatus 1002 executes processing for verifying document files registered with the document management server 1003, according to the present invention.

FIG. 4 shows the transition of dialogs which are displayed on the display section (not shown) of the document verification apparatus 1002 when the document verification apparatus 1002 executes processing for verifying document files registered with the document management server 1003.

A dialog 4000 is a dialog for displaying the names of document files stored in the document management server 1003 with signatures attached. The document registration apparatus 1001 displays this dialog on its display section.

A dialog 4002 is a search condition setting dialog which is displayed by the document registration apparatus 1001 to cause the user to select a search condition for searching for a desired document file from among document files registered with the document management server 1003.

When the user selects "CLOSE" on the search condition setting dialog 4002, the processing of this flowchart ends.

When the user selects a search condition and then selects "SEARCH" on the search condition setting dialog 4002, the document verification apparatus 1002 notifies the search condition to the document management server 1003. Then, at step 4003, the document management server 1003 searches the documents in the document management server 1003 in accordance with the search condition. The document management server 1003 sends multiple document files, which are the result of the search, to the document verification apparatus 1002. Receiving the search result, the document verification apparatus 1002 displays the search result on the display section of the display section of a search dialog 4004.

In the search dialog 4004, the number of document file names specified by the user in advance are displayed. When the user selects "NEXT/PREVIOUS" on this search dialog 4004, the document management server 1003 performs search again, and the result of the next rank/previous rank search is displayed in the search dialog 4004.

When the user selects "VERIFY" on the search dialog 4004, the document verification apparatus 1002 verifies the multiple document files which are the result of the search (this verification processing will be described with the use of FIG. 10) at step 4005. Then, the summary of the verification result is displayed in a verification result dialog 4006 as the latest verification result.

When the user selects "OK" on the verification result dialog 4006, the flow returns to the search dialog 4004. In this case, in the search dialog 4004, the result of the verification of each document file is newly displayed on the same line of the name of each document file.

Though it is assumed that multiple document files included in the list of the search result are verified in the verification processing at step 4005, it is also possible that the user selects verification target documents on the list.

Figure 10:
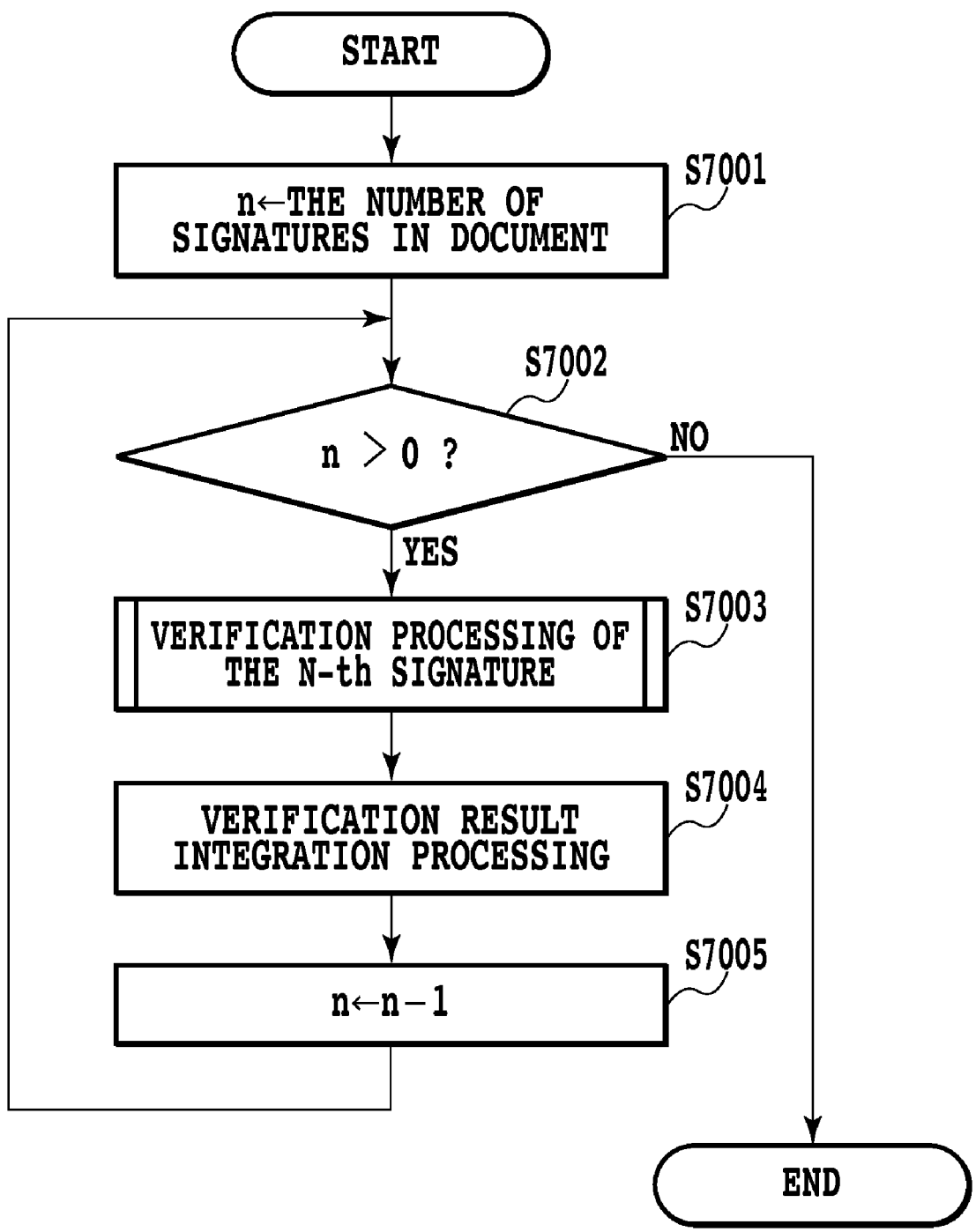
FIG. 10 is a diagram showing processing by the document management server for verifying a verification target document file, according the present invention.

FIG. 10 shows the flow of processing executed when the validity of a document file which includes n signatures is verified. The document verification apparatus 1002 which executes each processing in this processing flow is totally controlled by a CPU (not shown) which the document verification apparatus 1002 has.

The document verification apparatus 1002 determines a document file to be targeted by verification and starts verification of the document file. The document file to be targeted by verification will be hereinafter referred to as a verification target document file. The result of the verification of the verification target document file is determined on the basis of the "validity" of each signature included in the verification target document file.

At step 7001, the document verification apparatus 1002 counts the number of the signatures included in the verification target document file and sets the number for a variable n. Here, it is assumed that the signatures included in the verification target document file are given sequence numbers in chronological order. For example, the signature 1 (8002) in the document file shown in FIG. 15 is given a number 1, and the signature 2 (8003) is given a number 2.

At step 7002, the document verification apparatus 1002 confirms whether n is a positive number. When n is 0 (there is not a signature to be verified), the document verification apparatus 1002 ends the verification processing of the verification target document file. When n is 1 or more (there is a signature to be verified), the flow proceeds to step 7003.

At step 7003, the document verification apparatus 1002 performs verification processing of the n-th signature included in the verification target document file. The details of this processing will be described later with the use of FIG. 11.

At step 7004, the document verification apparatus 1002 performs processing for determining the result of the verification of the verification target document file (this processing will be hereinafter referred to as verification result integration processing) on the basis of the result of the verification of the n-th signature. The "result of the verification" by this verification result integration processing may be "valid" or "invalid". Furthermore, in the case of "invalid", there are three classifications: "certificate is not valid", "edited" and "falsified". That the "result of verification" is "valid" means that all the signatures in the document have not been falsified, the certificate is valid, and editing has not been performed after the signatures were given. The "result of verification" will be described later in detail with the use of FIG. 12.

At step 7005, n minus 1 is set as new n, and the flow returns to step 7002. In this way, the verification processing of all the signatures included in the document file is performed, and the final verification result of the document file is determined. The final verification result is outputted on the basis of the verification result integrated at step 7004 (the verification result integration processing) when n=1.

Figure 11:
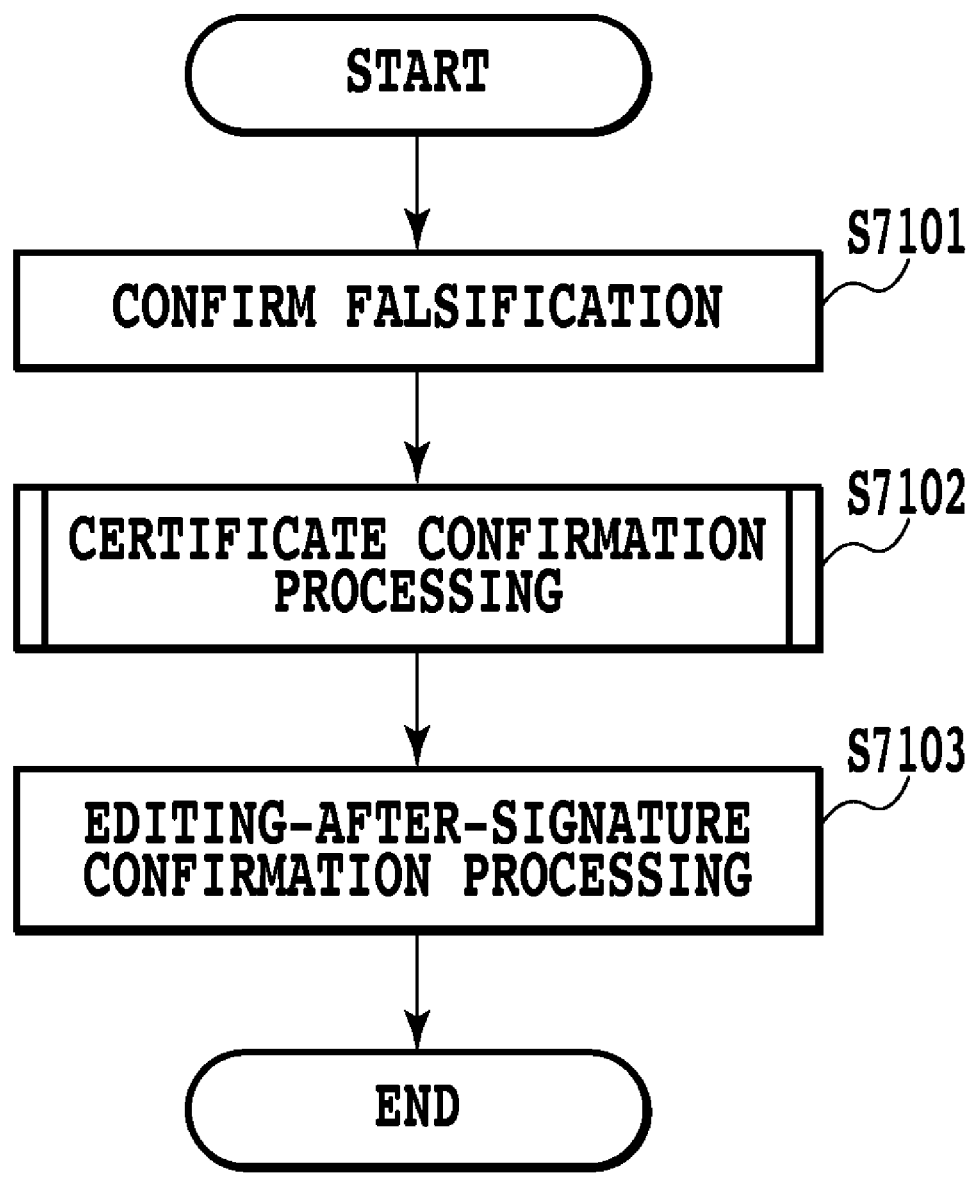
FIG. 11 is a diagram showing processing by the document verification apparatus 1002 for verifying the n-th signature included in a verification target document file, according to the present invention.

The verification processing of the n-th signature included in the verification target document file will be described with the use of the flowchart in FIG. 11. The document verification apparatus 1002 which executes each processing in this processing flow is totally controlled by the CPU (not shown) which the document verification apparatus 1002 has.

As preparation for description of this flowchart, the terms "falsification" and "editing" will be defined.

"Falsification" means an act of illegally changing a document file which includes a signature. For example, an act of opening a document file which includes a signature, in a binary format, and changing the binary data (changing a 0 bit to a 1 bit) is falsification.

"Editing" means an act of changing a document file which includes a signature in a manner which is not illegal. For example, an act of opening a document file which includes a signature, in a PDF format, making a change in the original document included in the PDF data, and giving information indicating what change has been made, to the document file is "editing".

Figure 16:
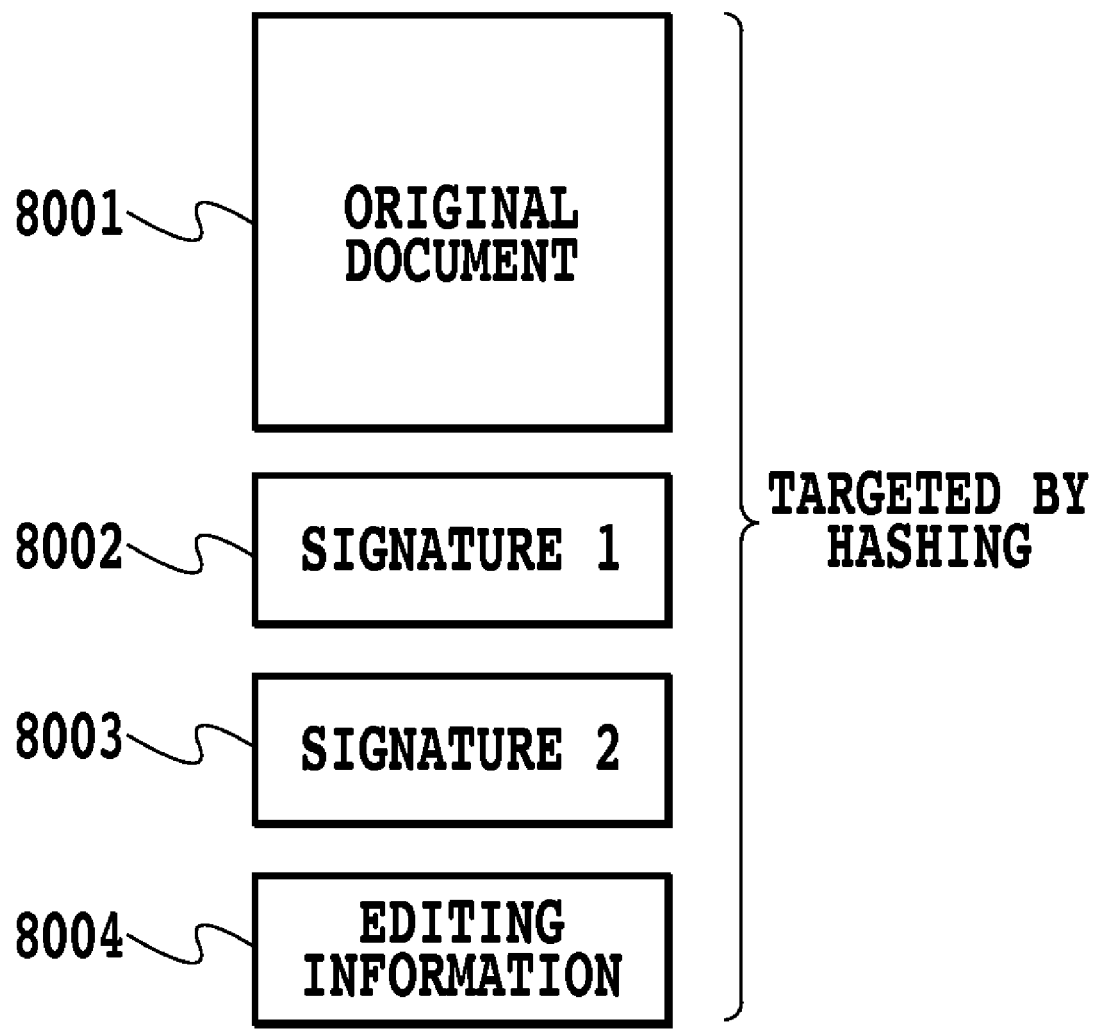
FIG. 16 is a diagram showing a document file having the original document, the signature 1, the signature 2 and editing information according to the present invention.
Figure 17:
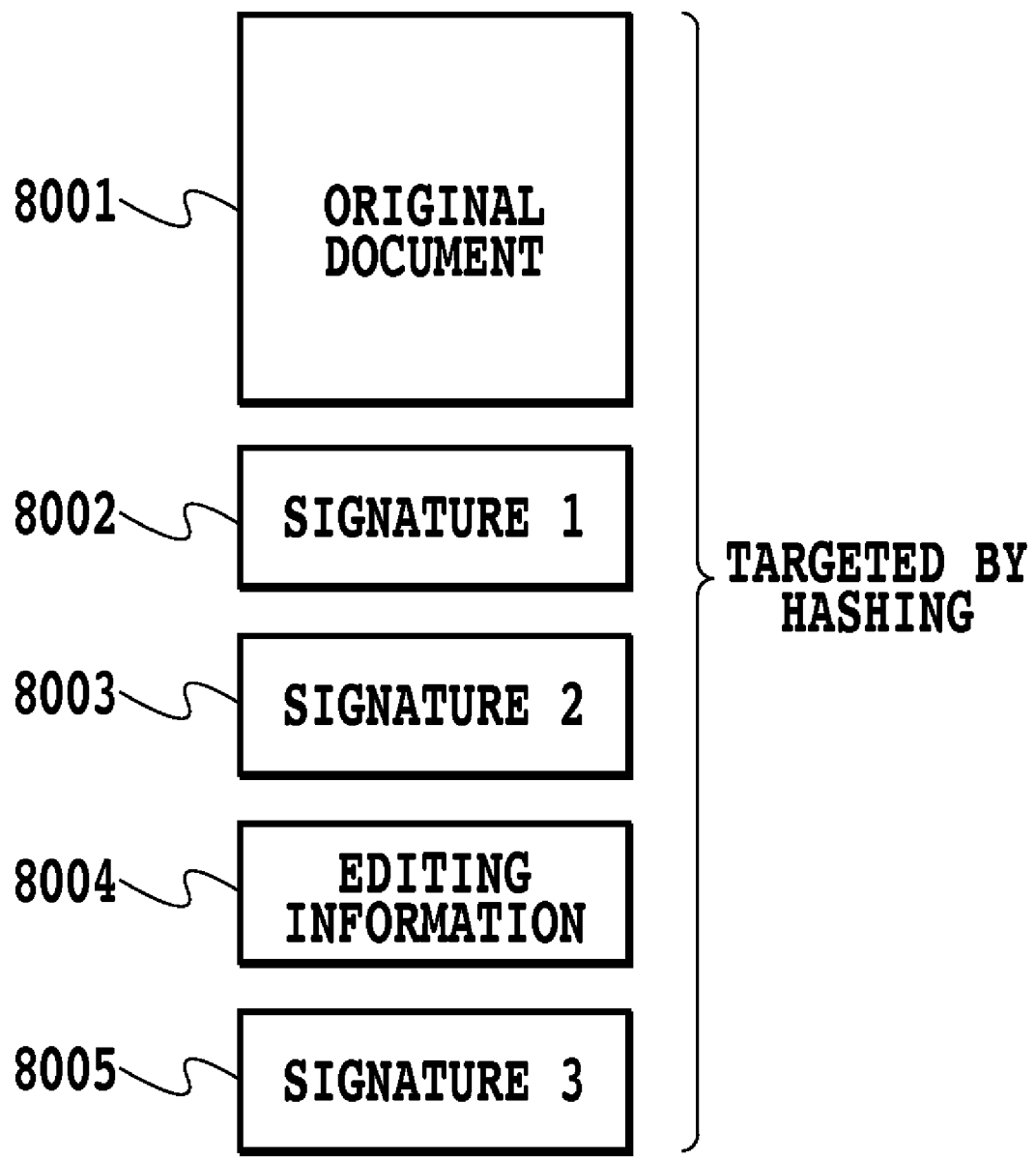
FIG. 17 is a diagram showing a document file having the original document, the signature 1, the signature 2, the editing information and a signature 3 according to the present invention.

In other words, "falsification" is an act of changing data in a manner that information before the "falsification" is lost, and "editing" is an act of changing data in a manner that information before "editing" is not lost. The "information indicating what change has been made" described above is referred to as "editing information" in this specification. The contents of the above will be described with the use of FIGS. 15 and 16. When editing is performed for the document file shown in FIG. 15, editing information 8004 is added, and the document file shown in FIG. 16 is generated. FIG. 17 shows a document file generated by further adding a signature 3 (8005) to the document file shown in FIG. 16.

At step 7101, the document verification apparatus 1002 confirms whether falsification of the verification target document file was not performed after the n-th signature was given and before the (n+1)th signature was given. However, in the case where the n-th signature is the newest signature in the verification target document file, the document verification apparatus 1002 may confirm whether falsification of the verification target document file has been performed after the n-th signature was given, at this step 7101.

When the n-th signature is an electronic signature, the concrete contents of the processing at this step 7101 is as follows. First, the document verification apparatus 1002 decrypts a hash value included in the n-th signature (electronic signature) with the use of a public key in the certificate included in the n-th signature (electronic signature). Furthermore, the document verification apparatus 1002 calculates a hash value from the document file before being given the n-th signature (electronic signature). Then, the document verification apparatus 1002 compares the decrypted hash value and the calculated hash value. If the two hash values are different values as the result of the comparison, the document verification apparatus 1002 judges that "falsification" has been performed. If the two hash values are the same values, the document verification apparatus 1002 judges that "falsification" has not been performed.

On the other hand, if the n-th signature is a timestamp signature, the concrete contents of the processing at this step 7101 is as follows.

First, the document verification apparatus 1002 decrypts a hash value included in the n-th signature (timestamp signature) with the use of a public key included in the n-th signature (timestamp signature). Furthermore, the document verification apparatus 1002 calculates a hash value from the document file before being given the n-th signature (timestamp signature). Then, the document verification apparatus 1002 compares the decrypted hash value and the calculated hash value. If the two hash values are different values as the result of the comparison, the document verification apparatus 1002 judges that "falsification" has been performed. If the two hash values are the same values, the document verification apparatus 1002 judges that "falsification" has not been performed.

At step 7102, the document verification apparatus 1002 confirms the validity of the certificate included in the n-th signature.

Figure 7:
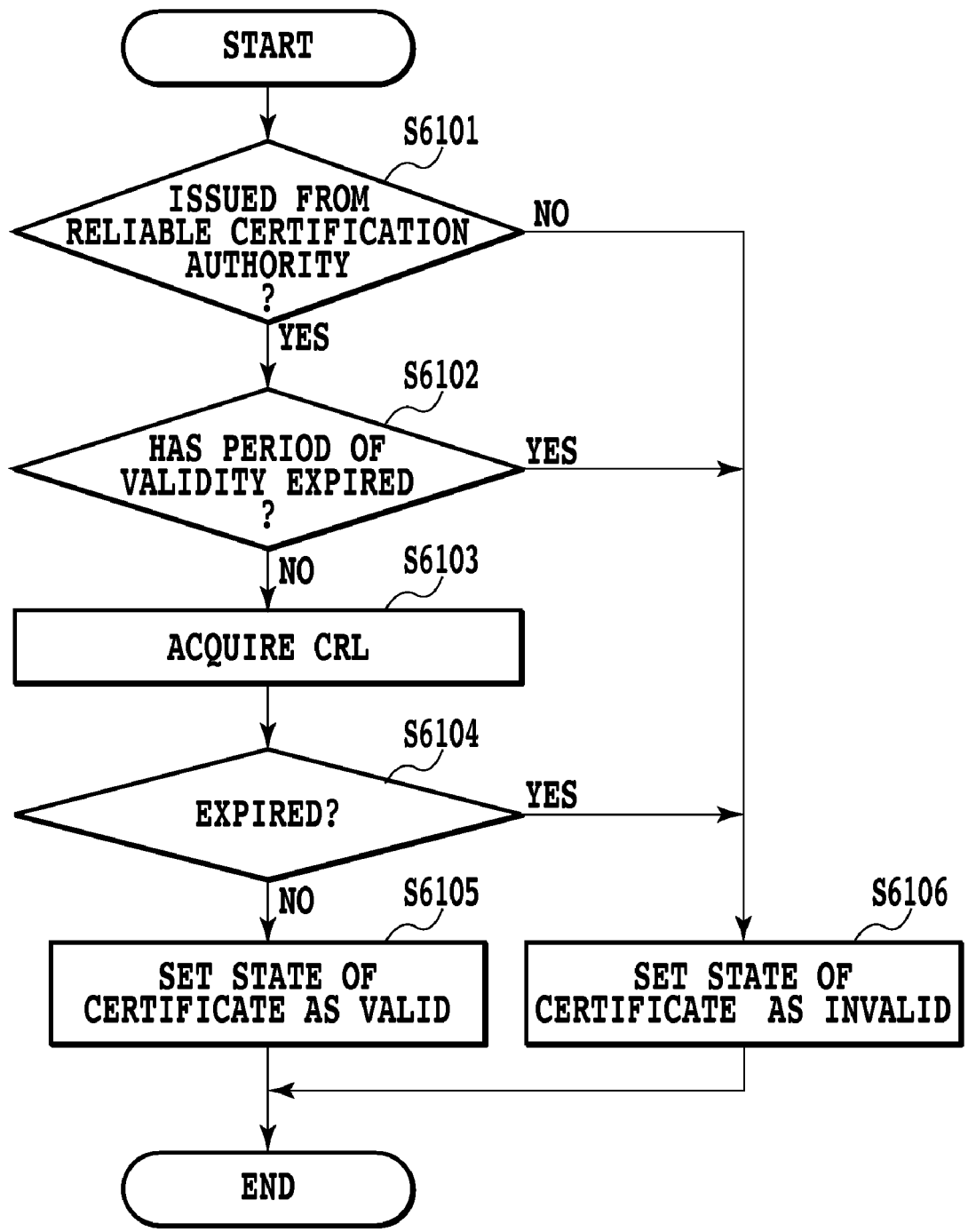
FIG. 7 is a diagram showing the flow of processing for checking the validity of a certificate used for an electronic signature, according to the present invention.

When the n-th signature is an electronic signature, the concrete contents of the processing at this step 7101 is similar to the certificate confirmation processing in FIG. 7. However, though the document registration apparatus 1001 performs the processing in FIG. 7, the document verification apparatus 1002 performs each processing at step 7101. Furthermore, in FIG. 7, when the certificate confirmation processing is performed, the state of the certificate is set as invalid whenever the period of validity of the certificate has expired. On the other hand, at step 7101, even if the period of validity of a certificate has expired when the certificate confirmation processing is performed, the state of the certificate is set as valid when a timestamp signature was given before the expiration of the period of validity.

When the n-th signature is a timestamp signature, the concrete contents of the processing at this step 7101 is as follows. That is, it is confirmed whether the timestamp signature is valid or not on the basis of the period of validity shown in the timestamp token included in the timestamp signature.

At step 7103, the document verification apparatus 1002 confirms whether or not editing of the original document has been performed after the n-th signature was given. This confirmation is performed on the basis of whether editing information is included in the verification target document file as shown in FIG. 16.

Figure 12:
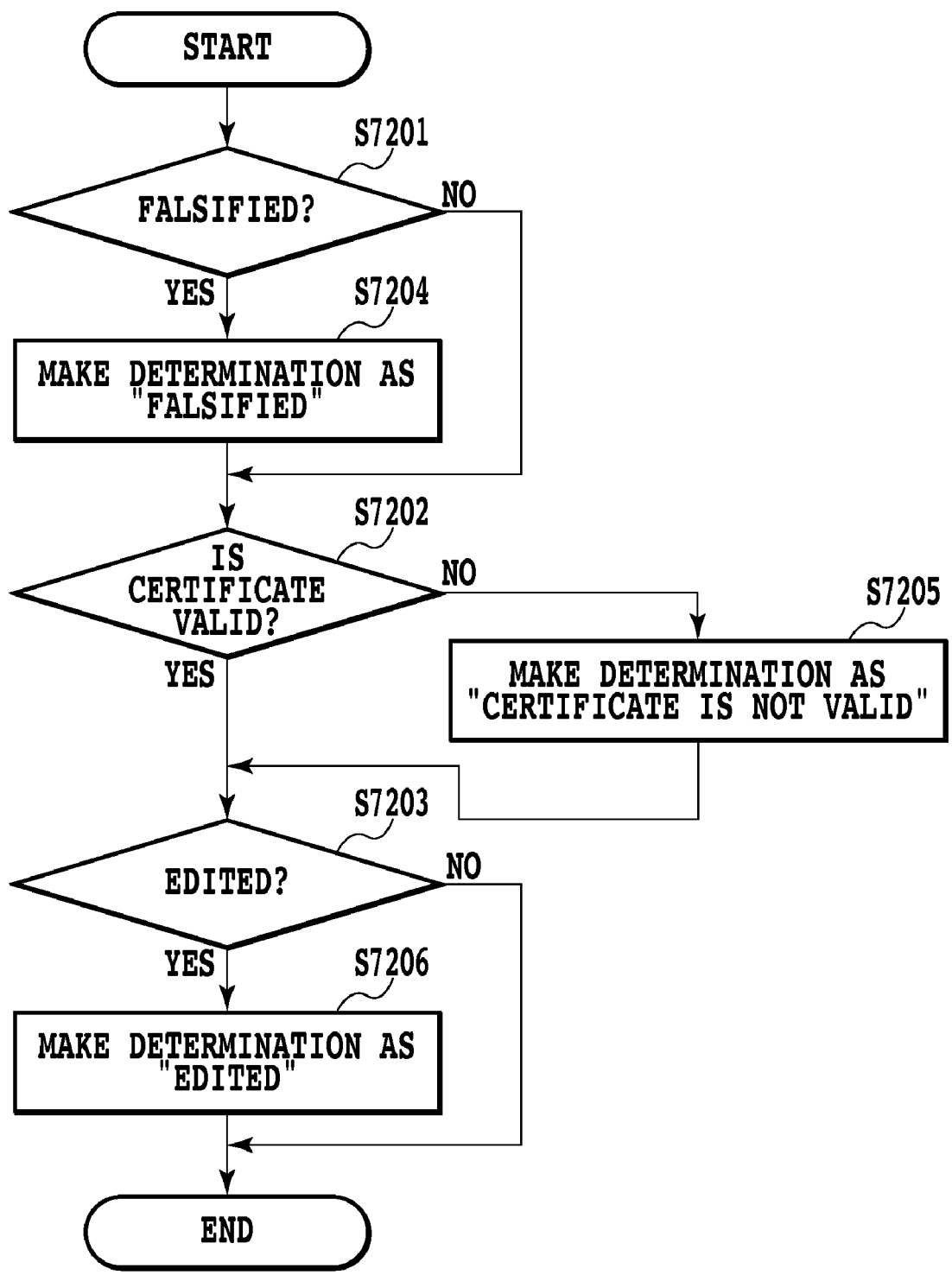
FIG. 12 is a diagram showing verification result integration processing performed by the document verification apparatus 1002, according to the present invention.

The processing for integrating results of verification of signatures included in a verification target document file will be described with the use of the flowchart in FIG. 12. The document verification apparatus 1002 which executes each processing in this processing flow is totally controlled by the CPU (not shown) which the document verification apparatus 1002 has.

At step 7201, the document verification apparatus 1002 judges whether or not falsification has been performed for a verification target document file, on the basis of the n-th signature. If it is judged that falsification has been performed, the flow proceeds to step 7204 and determines the "falsification verification result" as "falsified". After that, the flow proceeds to step 7202. If it is judged that falsification has not been performed, the flow proceeds to step 7202.

At step 7202, the document verification apparatus 1002 judges whether the certificate included in the n-th signature is valid. If it is judged that the certificate is not valid, the flow proceeds to step 7205 and determines the "certificate verification result" as "certificate is not valid". After that, the flow proceeds to step 7203. If the certificate is judged to be valid, the flow proceeds to step 7203.

At step 7203, the document verification apparatus 1002 judges whether or not editing of the verification target file has been performed on the basis of the n-th signature. If it is judged that editing has been performed, the flow proceeds to step 7206 and determines the "editing verification result" as "edited".

The verification results of steps 7204, 7205 and 7206 are integrated with the results of verifications performed so far.

It is assumed that, before start of the verification processing, the document verification apparatus 1002 sets the "falsification verification result" as "not falsified", the "certificate verification result" as "valid", and the "editing verification result" as "not edited" in advance.

Figure 2:
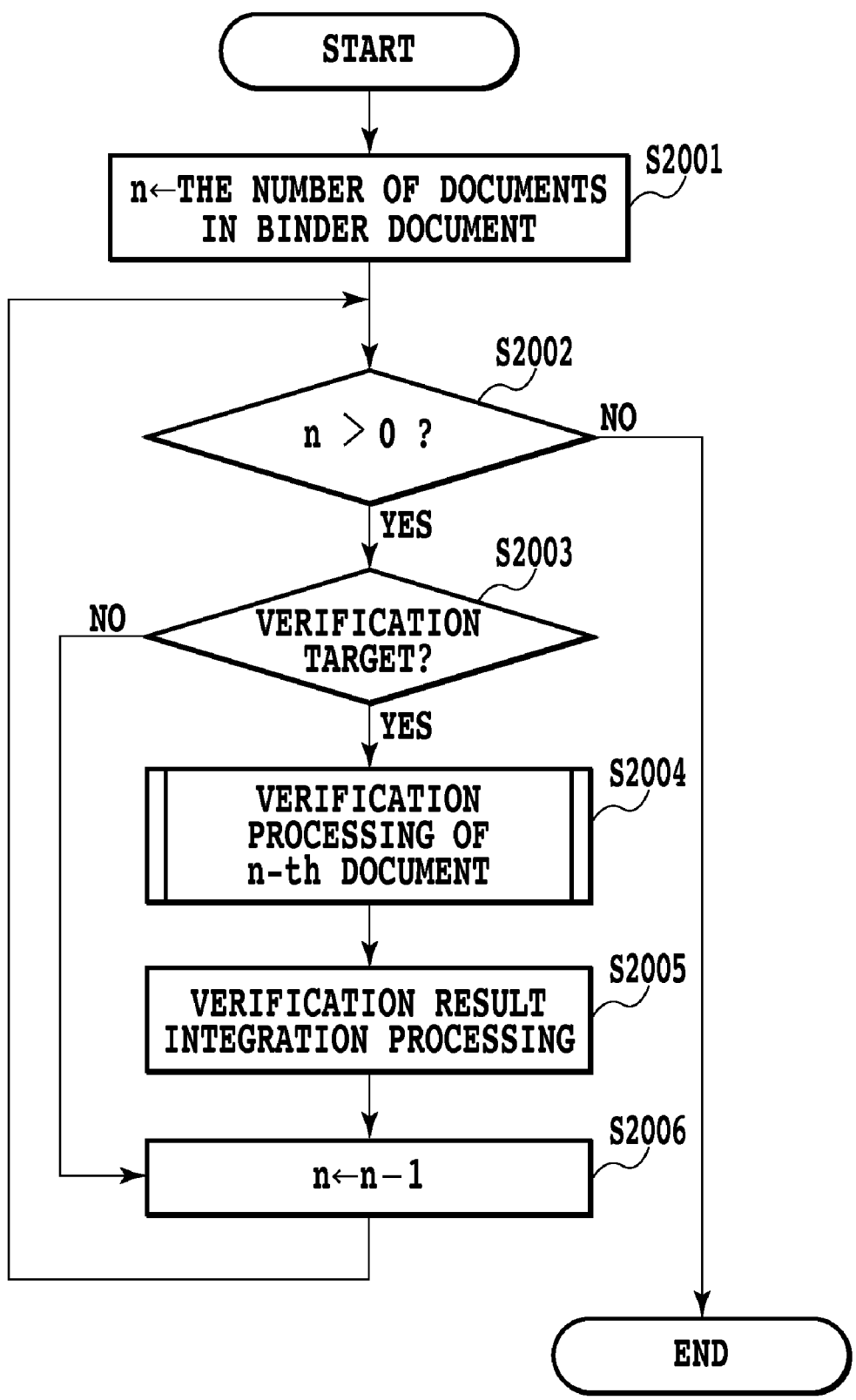
FIG. 2 is a diagram showing the flow of verification of a binder document according to the present invention.

In the above description, the outline of registration processing and verification processing of a document has been explained. Next, description will be made on the case where a verification target document is a binder document. FIG. 2 shows the flow of processing executed for a binder document which includes n document files when the validity of the binder document files is verified. The document verification apparatus 1002 which executes each processing in this processing flow is totally controlled by the CPU (not shown) which the document verification apparatus 1002 has.

The document verification apparatus 1002 determines a binder document to be targeted by verification and starts verification of the binder document. The binder document to be targeted by verification will be hereinafter referred to as a verification target binder document. The result of the verification of the verification target binder document is determined on the basis of the "validity" of each document included in the verification target binder document.

At step 2001, the document verification apparatus 1002 counts the number of documents included in the verification target binder document, and sets the number for a variable n. Here, it is assumed that the documents included in the verification target binder document are given sequence numbers in chronological order. At step 2002, the document verification apparatus 1002 confirms whether n is a positive number. When n is 0 (there is not a document to be verified), the document verification apparatus 1002 stores the contents of the verification of the verification target binder document and ends the verification processing of the verification target binder document. When n is 1 or more (when there is a document to be verified), the flow proceeds to step 2003.

At step 2003, the document verification apparatus 1002 determines whether the n-th document included in the verification target binder document is to be targeted by verification. In this embodiment, this determination is made on the basis of an identifier indicating whether or not to be verified, which has given in FIG. 18. If the document is not a verification target, the flow proceeds to step 2007. If the document is a verification target, the flow proceeds to step 2004.

At step 2004, the document verification apparatus 1002 performs verification processing of the n-th document included in the verification target binder document. The details of this processing are similar to the description on FIGS. 10 to 12.

At step 2005, the document verification apparatus 1002 performs processing for integrating the result of verification of the verification target binder document (this processing will be hereinafter referred to as verification result integration processing below) on the basis of the result of the verification of the n-th document. That is, the verification results of documents which have been verified up to this time point are collected to update the verification result of the verification target binder document. The state after this verification result integration processing is the state of "all the verification target documents up to the n-th document being valid" or the state of "one or more among the verification target documents up to the n-th document being invalid".

At step 2006, n minus 1 is set as the new value of n, and the flow returns to step 2002. In this way, verification processing of all the documents included in the binder document is performed, and the final verification result of the binder document is determined. The final verification result is outputted on the basis of the verification result integrated at step 2005 (the verification result integration processing) when n =1. Since it is possible to output a verification result of a binder document on the basis of verification results of documents determined as verification targets, among documents included in the binder document, the verification result of the binder document is not affected even if documents which do not have to be verified are stored in the binder document. Furthermore, since documents which do not have to be verified and determined not to be verified are not verified, the verification time can be reduced.

Figure 5:
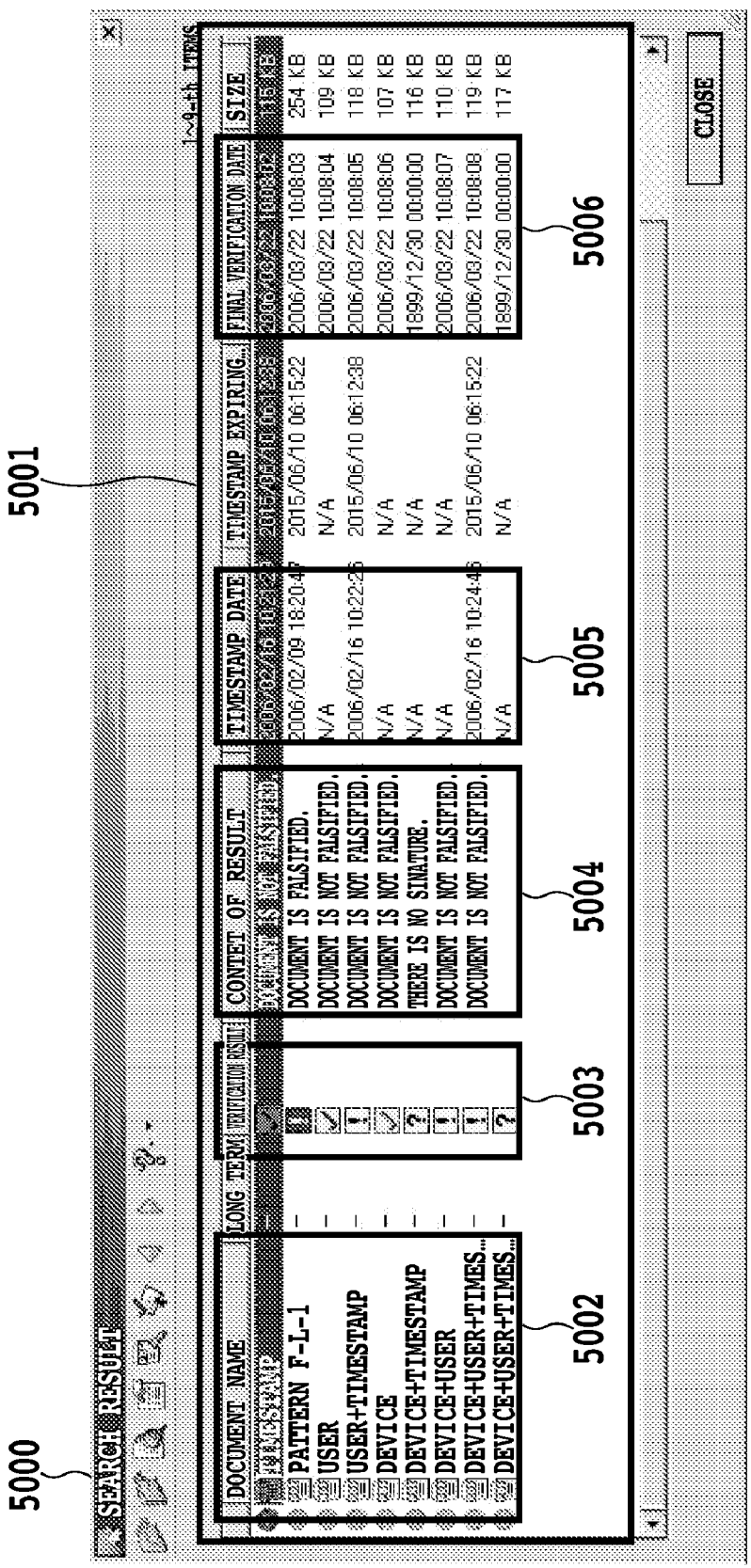
FIG. 5 is a diagram showing a verification result display screen according to the present invention.

A verification result dialog 5000 in FIG. 5 is an enlarged diagram of the search dialog 4004 after verification processing is performed. This verification result dialog 5000 is also a dialog to be displayed on the display section when the document verification apparatus 1002 in FIG. 10 ends verification processing.

Reference numeral 5001 denotes a verification result display area. The verification result display area 5001 is configured by the following areas. That is, it is configured by a document name area 5002, a verification result icon display area 5003, a verification result content display area 5004, a timestamp signature giving date and time display area 5005, and a final verification date and time display area 5006.

The document name area 5002 is an area for displaying the document name of each document file.

The verification result icon display area 5003 is an area for displaying the result of verification processing of each document file by an icon. The icon to be displayed is a "checkmark (√)" icon, a "!" icon, a "(solid-white)!" icon or a "?" icon. In this embodiment, the "checkmark (√)" icon indicates that the document file is "valid". The "!" icon indicates that the document has "some problem other than falsification". The "(solid-white)!" icon indicates that the document file has been "falsified". The "?" icon indicates that the document file is "unverified".

The "valid" is added to such a document file that the result of the verification processing in FIG. 10 is "valid".

The "some problem other than falsification" is added to such a document file that the result of the verification processing in FIG. 10 is "certificate is not valid" or "edited".

The "falsified" is added to such a document file that the result of the verification processing in FIG. 10 is "falsified".

The "unverified" is added to such a document file for which the verification processing in FIG. 10 has not been performed yet.

Reference numeral 5004 denotes a verification result content display area. The details of a verification result is displayed on the basis of the "falsification verification result", the "certificate verification result" and the "editing verification result" determined in FIG. 12.

Reference numeral 5005 denotes a timestamp signature giving date and time display area, in which the date and time when a timestamp signature is given last is shown.

Reference numeral 5006 denotes a final verification date and time display area, in which the last date and time among the dates and times when the document file was verified.

The document verification apparatus and the document registration apparatus described in this embodiment are assumed to function as a processing section (unit) for executing each of the processings corresponding to the flowcharts by executing a computer program with the use of a CPU, a memory and the like not shown. That is, the present invention also includes the computer program (document verification program) to be executed on a computer. Furthermore, the present invention also includes a computer-readable storage medium in which the document verification program is stored. The present invention is not limited to such that causes a computer to function as each processing unit by a computer program. A part or all of it may be realized by hardware (electronic circuits).

(Other Embodiments)

In the embodiment described above, when a binder document is created, whether or not a binding target document is to be targeted by verification is registered in advance, and it is determined whether or not each document is to be targeted by verification on the basis of a registered identifier when verification is performed. However, it is not limiting. For example, a configuration is also possible in which the type of document to be targeted by verification is specified, and the type of each document included in a binder document is automatically determined when verification is performed so as to determine whether the document is a verification target document or not.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-159295, filed Jun. 15, 2007, which is hereby incorporated by reference herein in its entirety.

What is claimed is:

1. A document verification method executed by an apparatus for verifying a binder document which includes a plurality of binding target documents, the method comprising:

a selection step of selecting the binding target documents which are to be included in the binder document;

a decision step of deciding whether each of the selected binding target documents is to be targeted by verification or not;

an assigning step of assigning an identifier for each of the selected binding target documents based on the decision in the decision step, the identifier indicating whether each of the binding target documents is a verification target document or not;

a storing step of storing the binder document which includes the binding target documents selected in the selection step;

a determination step of determining whether each of the binding target documents included in the binder document is a verification target document or not, based on the identifier assigned for each of the binding target documents in the assigning step;

a verification step of performing a verification process for each binding target document which has been determined to be a verification target document in the determination step, wherein the verification process is not performed for binding target documents which have not been determined to be a verification target document in the determination step;

an integration step of integrating the results of the verification processes performed in the verification step; and a verification result storing step of storing the verification result integrated in the integration step as the result of verification of the stored binder document.

2. The document verification method according to claim 1, wherein, in the decision step, it is decided on the basis of a user instruction whether each of the binding target documents is to be targeted by verification or not.

3. The document verification method according to claim 1, wherein, in the decision step, it is decided on the basis of the type of each binding target document included in the binder document whether each of the binding target documents is to be targeted by verification or not.

4. The document verification method according to claim 1, wherein, in the decision step, it is decided on the basis of a signature already added to the binding target document whether each of the binding target documents is to be targeted by verification or not, wherein the signature includes at least one of an electronic signature and a timestamp signature.

5. A document verification apparatus comprising at least one processor which executes a computer program for verifying a binder document which includes a plurality of binding target documents, wherein the at least one processor functions as:

a determination unit configured to determine whether each of the binding target documents included in the binder document is a verification target document or not, based on an identifier which has been assigned for each of the binding target documents by a document registration apparatus;

a verification unit configured to perform a verification process for each binding target document which has been determined to be a verification target document by the determination unit, wherein the verification process is not performed for binding target documents which have not been determined to be a verification target document by the determination unit;

an integration unit configured to integrate the results of the verification processes performed by the verification unit; and a verification result storing unit configured to store the verification result integrated by the integration unit as the result of verification of the stored binder document, wherein the document registration apparatus comprising at least one processor which functions, by executing a computer program, as:

a selection unit configured to select the binding target documents which are to be included in the binder document;

a decision unit configured to decide whether each of the selected binding target documents is to be targeted by verification or not an assigning unit configured to assign an identifier for the each of the selected binding target documents based on the decision of the decision unit, the identifier indicating whether each of the binding target documents is a verification target document or not; and a storing unit configured to store the binder document which includes the binding target documents selected by the selection unit.

6. A non-transitory computer-readable storage medium in which a computer program is stored, the computer program causing a computer to execute each of the steps of:

a selection step of selecting binding target documents which are to be included in a binder document;

a decision step of deciding whether each of the selected binding target documents is to be targeted by verification or not an assigning step of assigning an identifier for the each of the selected binding target documents based on the decision in the decision step, the identifier indicating whether each of the binding target documents is a verification target document or not a storing step of storing the binder document which includes the binding target documents selected in the selection step;

a determination step of determining whether each of the binding target documents included in the binder document is a verification target document or not, based on the identifier assigned for each of the binding target documents in the assigning step;

a verification step of performing a verification process for each binding target document which has been determined to be a verification target document in the determination step, wherein the verification process is not performed for binding target documents which have not been determined to be a verification target document in the determination step;

an integration step of integrating the results of the verification processes performed in the verification step; and a verification result storing step of storing the verification result integrated in the integration step as the result of verification of the stored binder document.

* * * * *